Nov. 11, 1952 J. N. SWARR 2,617,765
AIR DOME CONTROL FOR ION EXCHANGE UNITS
Filed June 18, 1949 3 Sheets-Sheet 1

Fig. 1.

INVENTOR.
Jay Nelson Swarr,
BY Mildred Oncken
Agent.

Nov. 11, 1952 J. N. SWARR 2,617,765
AIR DOME CONTROL FOR ION EXCHANGE UNITS
Filed June 18, 1949 3 Sheets-Sheet 2

INVENTOR.
Jay Nelson Swarr,
BY Mildred Oncken
Agent.

Patented Nov. 11, 1952

2,617,765

UNITED STATES PATENT OFFICE 2,617,765

AIR DOME CONTROL FOR ION EXCHANGE UNITS

Jay N. Swarr, Evergreen Park, Ill., assignor to Corn Products Refining Company, New York, N. Y., a corporation of New Jersey Application June 18, 1949, Serial No. 99,911

8 Claims. (Cl. 210—24)

This invention relates, generally, to new and useful improvements in apparatus for controlling fluid flow through an ion exchange installation comprising a plurality of ion exchange units interconnected in series circuit flow relationship, wherein each of the individual ion exchange units is in the form of a closed vessel partially filled with a bed of ion exchange material with free board space thereabove which is maintained by an air dome during operation.

Ion exchange installations for de-ionizing liquids (i. e. either for de-cationizing or de-anionizing, or both) are known and in use in this country. Such ion exchange installations are in use for de-mineralizing water and aqueous solutions of various types such as, for example, raw sugar solutions. Although the particular design of such ion exchange installations may vary rather widely with respect to details of control and structure, they usually are basically composed of a series of individual ion exchange units of the closed vessel type, interconnected in series circuit flow relationship. The series of ion exchange units may, of course, consist of anion or cation exchangers, or both.

When a multiplicity of ion exchange units are interconnected in series circuit flow relationship, the relative position of the individual units may be shifted periodically according to a predetermined schedule so that some of the units may be off-line and undergoing regeneration while the other units are on-line and are becoming de-generated. The problem of controlling the flow rate throughout the entire series circuit, so as to maintain the liquid levels in each unit at the desired values, is very complex and can best be achieved by suitable automatic control equipment. The complexity of the control problem originates in the distribution of pressure levels throughout the system, and is due to the necessity for varying continuously these pressure levels during operation, as will be explained later.

The object of the present invention, generally stated, is the provision of new and improved apparatus for, and method of, controlling fluid flow through a plurality of ion exchange units interconnected in series circuit relationship wherein, in each individual unit in a series, the pressure level in the air dome is automatically adjusted to the proper value as the said unit shifts its position in the system.

An important object of the invention is the provision of apparatus for, and method of, controlling flow of fluid under treatment through a plurality of ion exchange units interconnected in series circuit flow relationship.

Still another important object of the invention is the provision of control apparatus for maintaining and controlling fluid flow through an ion exchange installation wherein a plurality of ion exchange units are interconnected in series circuit flow relationship, which apparatus comprises differential pressure controllers associated with each individual ion exchange unit with the controlled pressure outlet connection of each controller being interconnected with the air dome of the ion exchange unit associated therewith, with the reference pressure inlet connection of each controller being interconnected with the air dome of the next subsequent ion exchange unit in the series, and with the supply pressure connection of each controller being connected with a source of air pressure sufficient to at least maintain fluid flow through each individual unit, the differential setting of each controller being such that the differential pressure between two adjacent air domes is more than sufficient to overcome total resistance to flow between said adjacent ion exchange units in the series, including the resistance to flow offered by the respective beds of ion exchange material.

Other objects of the invention will in part be obvious, and will in part appear hereinafter.

For a more complete understanding of the nature and scope of the invention, reference may now be had to the following detailed description of certain presently preferred embodiments thereof taken in connection with the accompanying drawings, wherein.

Figure 1:
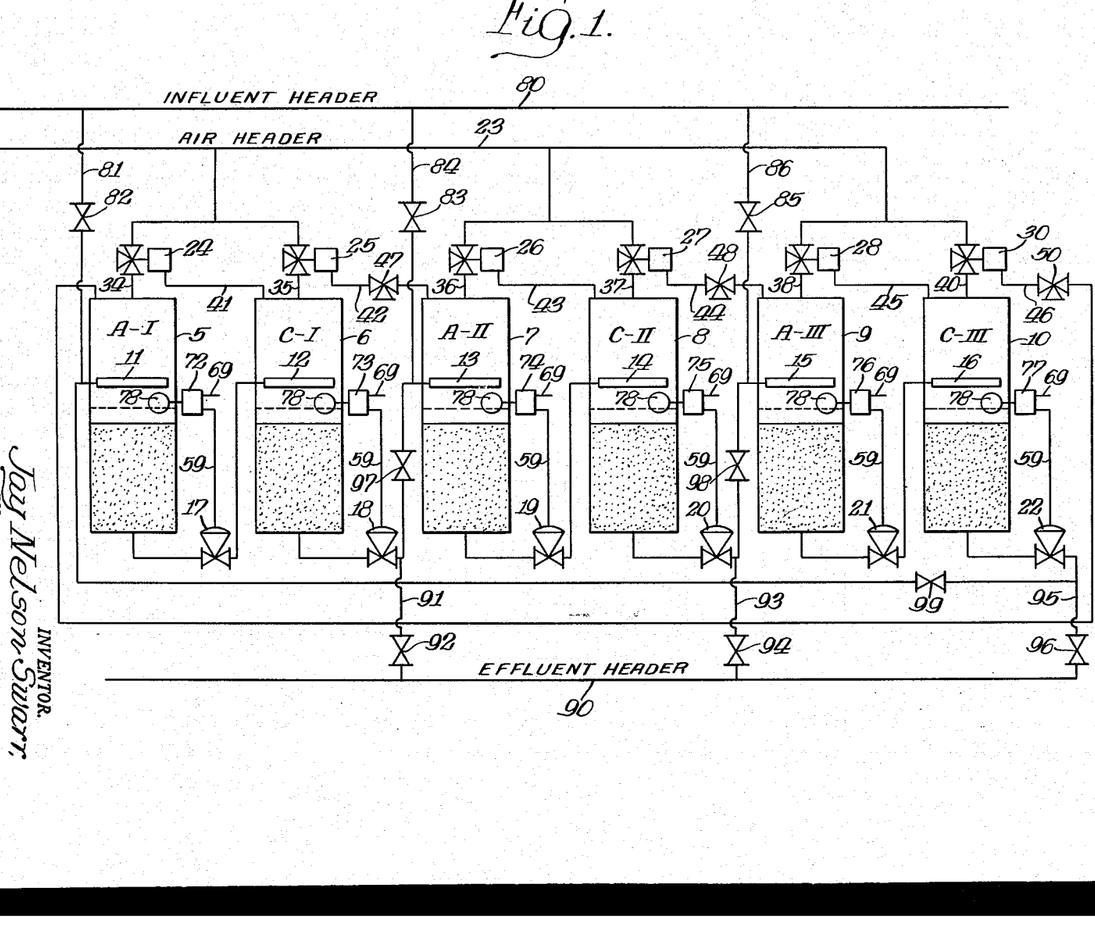
Figure 1 is a diagram of an ion exchange installation comprising a plurality of individual ion exchange units interconnected in series circuit flow relationship and with the control apparatus of the present invention being shown diagrammatically in operative interconnection therewith.

Referring now to Figure 1 of the drawings, the ion exchange installation shown therein contains six individual ion exchange units, three of these being anion exchange units and indicated as A-I, A-II, and A-III, and three cation exchange units designated as C-I, C-II, and C-III. It will, of course, be understood that the installation could contain a greater or lesser number of units. The individual anion and cation exchange units are of known structure and design and are in the form of closed vertical cylindrical tanks 5, 6, 7, 8, 9 and 10, respectively, each of which is provided with an ion exchange bed in the lower part thereof, as shown, with the free board spaces above the beds of ion exchange material being maintained by the air domes.

Fluid undergoing ion exchange treatment is distributed onto the bed's exchange material in each unit on-line from distributor devices 11, 12, 13, 14, 15 and 16, each of which is connected with the bottom outlet connection of the next previous ion exchange unit by means of a conduit provided with a diaphragm-operated, throttling flow control valve 17, 18, 19, 20, 21 and 22, respectively.

In accordance with standard procedure for de-mineralizing a fluid, the individual ion exchange units are operated in pairs, each of which comprises an anion exchange unit and a cation exchange unit. Thus, in Figure 1, units A-I and C-I form one pair, units A-II and C-II form another pair, and units A-III and C-III form the third pair. With respect to the direction of fluid flow therethrough, the cation exchange unit in each pair is usually placed ahead of the anion exchange unit, this also being a conventional and known arrangement; however, where desired this sequence may be reversed.

Usually, two of the three pairs of the ion exchange units will be on-line while the third pair is off-line and being regenerated. Thus, four of the individual ion exchange units are normally operated in series circuit flow relationship with the more recently regenerated units usually being the more remote in the direction of fluid flow therethrough. That is, in the usual case, the raw fluid undergoing de-mineralization first enters the pair of anion and cation exchange units which are the more depleted and which are the next to be regenerated. In this manner, the greater capacity of the freshly regenerated units more completely to remove anions and cations, is taken advantage of in accordance with known practice.

Efficient operation of the ion exchange installations requires that the fluid level in each ion exchange unit be maintained at, or just above, the top of the bed of exchange material therein, this level to be accurately maintained despite variations in the pressure drop in the flowing stream through and between successive units, which variations can be caused by variations in flow rate or variations in the resistance of the ion exchange beds.

In order to understand the mechanism of fluid flow through a system such as is shown in Figure 1, assume that columns A-I, C-I, A-II and C-II are on stream, while columns A-III and C-III are off the line being regenerated. The fluid enters the system from influent header 80, through shut-off valve 82, to column A-I. It leaves A-I through diaphragm control valve 17 and enters column C-I through distributor 12. It leaves C-I and enters A-II through diaphragm control valve 18 and shut-off valve 97, shut-off valves 83 and 92 being closed. It leaves A-II through diaphragm control valve 19 and enters C-II. It leaves C-II and enters the effluent header 88 through diaphragm control valve 20, conduit 93, and shut-off valve 94, shut-off valve 98 being closed. To those familiar with the laws of fluid flow, it is obvious that the fluid pressure at the top of the ion exchange bed of C-II must be equal to the pressure drop through the bed of C-II and through its effluent piping. In the same way the fluid pressure at the top of the ion exchange bed of A-II must be equal to the pressure drop through the bed of A-II and its effluent piping, plus the fluid pressure in C-II. Continuing this reasoning, it is apparent that the pressure on the surface of A-I must be equal to the sum of the pressure drops through the four beds and through the conduit systems connecting the four columns. Obviously, then the fluid pressure at any point in the system will be equal to the summation of all pressure drops in the system following that point. Where the air dome is used, the incoming liquor to a given column is unable to exert any pressure on the surface of the liquor in that column. Therefore, the pressure on the surface of the liquor in any given column must be supplied by the air in the air dome of that column. It follows then that the pressure in any air dome must always equal the summation of all pressure drops in that column and all succeeding columns. Assume now the system to be in operation under equilibrium conditions with a constant feed rate. If there is then an increase in the resistance of a given bed, say A-II, the flow rate through A-II and the succeeding portion of the system will decrease, which will cause the level in A-II to increase. The flow rate can be maintained at its original value, either by decreasing the resistance in the circuit by an amount equal to the increase in bed resistance, or by increasing the air pressure in the air dome of A-II. While the second method is widely used, it is undesirable because it requires that the pressures in all preceding columns be increased by an equal amount. Because resistances are constantly changing to a greater or lesser extent, this method of control keeps the entire system continuously out of balance, so that accurate maintenance of levels and flow rates is impossible. The alternate method, on the other hand, which is that of changing the flow resistance in some other part of the circuit, is very easy to accomplish without affecting the remainder of the system. In the above example, the opening of valve 19 can be increased, so that the flow resistance across this valve is decreased by the same amount that the resistance through the bed was increased. This method of control applies the correction to the column in which the resistance change occurs without affecting any other part of the system.

Assume now that the resistances remain constant, but that the flow rate of liquor into the system increases. Since the total pressure drop in the system cannot exceed the air pressure in A-I, there will be not increase in flow through A-I and the remainder of the system. The level will, therefore, increase in the first column. As in the above illustration, the correct flow conditions throughout the system can be established in either of two ways. The first method involves holding the air pressures constant, and decreasing resistances within the system, so that the pressure drops will remain at their original values with the higher flow rate. The second method would involve maintaining the resistances constant and increasing the air dome pressures to compensate for the higher pressure drops caused by the higher flow rate. The second method is used extensively, but is not satisfactory, due to the difficulty of stabilizing the system after a load change occurs. This is due to the fact that any pressure change in any column, other than the first, requires a readjustment of the pressures in all preceding columns. This makes it extremely difficult and, in fact, practically impossible, to restore the system to equilibrium. The first method is, therefore, to be preferred in that the resistance through each individual column can be varied without in any way affecting other components in the system. This is accomplished in the present example by increasing the openings of valves 17, 18, 19 and 20. The increased opening of any given valve decreases the pressure drop at that point sufficient to compensate for the increased pressure drop through the preceding column resulting from the increased flow rate.

The present invention makes possible the preferred method of control by which the air dome pressures are maintained constant and compensating resistances and pressure drops are introduced into the system by adjusting the valve openings in the interconnecting pipings. In establishing the pressures in the various air domes, it is obvious that the pressure in any given column must exceed that in the column immediately following by an amount which is equal to, or in excess of, the greatest anticipated pressure drop between the two columns. Thus, there are pressure differentials between each column. Where this system has been used in the past, the pressure in each column was individually controlled. This has a serious disadvantage in that it is difficult to make the changes in the column pressures which are necessary when the positions of the columns within the system are shifted as is done in removing a degenerated pair and adding a regenerated pair. This is done either by changing the control points of each pressure controller as its associated column is shifted to its new position, which operation is difficult and complex, or by maintaining constant control point settings and changing the column to which a given controller is connected which involves complicated valving and piping arrangements. The object of the present invention is to eliminate these disadvantages by utilizing pressure control devices which do not maintain predetermined pressures on each column, but which maintain constant predetermined differential pressures between adjacent columns. This scheme completely eliminates the necessity for changing pressure control points, or for switching air and pressure connections when a new pair is added. This will be evident from the following explanation. The control means of the present invention serves to supply air under pressure from the header 23 to the air domes of the individual ion exchange units which are on-line at any time, with a suitable differential between the pressures in adjacent air domes, the actual pressure level depending upon the particular series position of the individual ion exchange units. One of the important elements in the air control system is the differential pressure controller with which each ion exchange unit is provided as indicated at 24, 25, 26, 27, 28 and 30, and which will be more completely described below in connection with Figure 2. The actuating pressure inlet connection of each of these differential pressure controllers is connected by suitable conduit means to the header 23. Thus, the controllers 24 and 25 are connected with the air pressure header 23 by conduit means. Likewise, the controllers 26, 27, 28 and 30 are similarly connected to the header 23. The controlled pressure outlet connection of each differential pressure controller is connected to the air dome of the ion exchange unit with which the pressure controller is associated. Thus, the controlled pressure outlet connection of the controller 24 is connected by a conduit 34 to the air dome of the ion exchange unit A–I. Conduits 35, 36, 37, 38 and 40 connect the controlled pressure outlet connection of the controllers 25, 26, 27, 28 and 30, respectively, to the associated ion exchange units C–I, A–II, C–II, A–III and C–III. The reference pressure connection of each controller is connected through suitable conduit means to the air dome of the ion exchange unit subsequent thereto in the series circuit relationship. Thus, the reference pressure connection for the controller 24 is connected by the conduit 41 to the air dome of the ion exchange unit C–I. Similarly, the reference pressure connection of controllers 25, 26, 27, 28 and 30 are connected to the air domes of the ion exchange units A–II, C–II, A–III, C–III and A–I, respectively, by means of conduit connections 42, 43, 44, 45 and 46, respectively. Each of the connections 42, 44 and 46 is provided with a three-way valve 47, 48 and 50, respectively, of known type, which serves to disconnect each pair of ion exchange units A–I, C–I, A–II, C–II, A–III, C–III, respectively, from the series, and also to open the reference pressure connections of the pressure controllers 25, 27, and 30, respectively, to the atmosphere.

Figure 2:
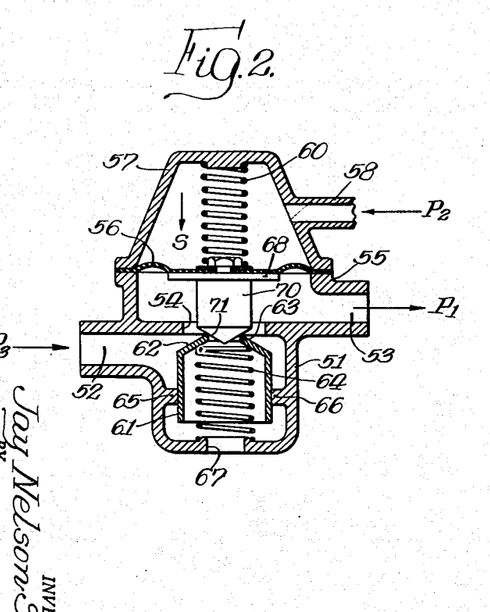
Figure 2 is a sectional view, certain parts being shown in elevation, through one of the differential pressure controller units forming part of the control apparatus of the installation shown in Figure 1.

The differential pressure controllers are of known type and are commercially available in different sizes and designs. Reference may now be made to Figure 2 of the drawings for a detailed description of one type of differential pressure controller which has been found suitable for use in the control system of the present invention. The valve body 51 has a supply pressure inlet connection 52, a controlled pressure outlet connection 53 and a main valve port 54. A circumferential flange 55 extends around the top of the body 51 and serves as a peripheral seat for a flexible diaphragm 56 secured to the flange 55 by means of a cap or cover 57. The cover 57 is provided with a reference pressure inlet connection 58 and a compression spring 60 is compressed between the top of the diaphragm 56 and the top of the cover 57 as shown. In actual design, the compression spring 60 is provided with an adjustable loading means so that the force or compression load delivered by the spring against the diaphragm 56, which force is designated as S, is made adjustable.

The main valve port 54 is adapted to be closed by a main valve member 61, having a conically shaped valve seat engaging portion 62 provided with a central opening 63 which serves as a relief valve port. The valve member 61 is biased to the closed or seated position by means of a compression spring 64, the bottom of which rests on the base of the valve body 51, as shown, and the top of which rests against the top portion 62 of the valve member 61. The movement of the valve member 61 is guided and sealed by the circumferential flange or shoulder 66 integrally formed on the interior of the valve body 51. The bottom of the valve body 51 is provided with an exhaust port 67, through which excess pressures may be released as will appear hereinafter.

A disc member 68 is secured to the under side of the flexible diaphragm 56 and serves as the support for a valve member 70 which depends therefrom and the lower end of which has a conical shape so as to serve as a valve member for closing the relief valve port 63 in the main valve member 61.

The operation of the differential pressure controller shown in Figure 2 is as follows:

Assuming that the reference pressure has a value of $P_2$ and it is desired to produce a controlled pressure $P_1$, which is greater than the reference pressure by a known amount, then the spring 60 is adjusted so as to produce a compression force S which will result in the increased pressure desired.

This relationship may be expressed by the following equation where A designates the effective area of the diaphragm 56:

$$P_2 + \frac{S}{A} = P_1$$

Rearranging, the equation becomes $$\frac{S}{A} = P_1 - P_2$$

which indicates that the controller unit will maintain a constant differential in pressure which is determined by the force or setting S of the spring 60.

Where the equilibrium conditions represented by the above equation exist, the main valve member 61 will be seated so as to close the main valve port 54, and the relief valve member 70 be seated so as to close relief valve port 63. There are four different conditions which may arise to destroy this equilibrium. These are an increase in $P_1$, a decrease in $P_1$, an increase in $P_2$, or a decrease in $P_2$. An increase in $P_1$ or a decrease in $P_2$ represent an increase in the differential pressure. Either condition will cause relief valve member 70 to be raised from relief port 63, which will permit air to be released to the atmosphere until equilibrium conditions are again restored. On the other hand, either a decrease in $P_1$ or an increase in $P_2$ represent a decrease in the differential pressure. In either case, member 70 joins main valve member 60 downward which causes main valve port 54 to be opened. This permits supply air to flow into the system which will increase $P_1$. This flow will continue until equilibrium conditions are again restored at which time valve port 54 will be again closed. Thus the unit operates to maintain a constant differential pressure which is always equal to $$\frac{S}{A}$$

this differential being altogether independent of the actual pressure level which may be anywhere between atmosphere and $P_3$.

Proper operation of the ion exchange units requires that the fluid level therein be maintained at, or slightly above, the top level of the bed of ion exchange material in each unit. As previously explained, a change in the pressure drop through any column will result in a change in level in that column. Conversely then a change in the level of a given column indicates the need for readjustment of the diaphragm valve in the effluent of that column in order to compensate for the change in pressure drop. Accordingly, each of the individual ion exchange units is provided with its own level control unit which operates in cooperation with the flow regulating valves 17, 18, 19, 20, 21 and 22. Level controllers of several different types are known and are commercially available, in each of which an element is provided which is sensitive to liquid level. In Figure 1 pilot operated, pneumatic level controllers 72, 73, 74, 75, 76, 77 of known type are provided with liquid level sensitive elements in the form of float members 78—78. Each of the level controllers 72, 73, etc. has a supply or actuating inlet pressure connection 69, as shown. The output pressure connections 59—59 of the level controller units are suitably interconnected with the flow regulating valves associated therewith in connection with the individual ion exchange units.

If the liquid level should fall below normal in one of the ion exchange units, the particular float element therein will drop and this will result in a decrease in outlet pressure delivered by the level controller to the diaphragm of the associated flow regulating valve thereby producing a partial closing off of the latter to allow the liquid level to build up to normal. On the other hand, if the level in an individual ion exchange unit should arise above normal, then there will be an increase in the output pressure which will be transmitted to the diaphragm which will serve to open the associated flow regulator sufficiently to allow the liquid to discharge from the ion exchange unit at an increased rate, thereby restoring the liquid level to normal.

By way of example, the flow regulating valves 17, 18, etc. and the level controllers 72, 73, etc. may be of a known commercial type produced and sold by the Fisher Governor Co. of Marshalltown, Iowa. The differential pressure controllers 24, 25, etc. may be of known commercial type made and produced by Moore Products Co. of Philadelphia, Pennsylvania.

The operation of the ion exchange installation shown in Figure 1 may be described in connection with the de-mineralization of an ash-containing sugar solution such as diluted corn syrup. Assuming that the pair of ion exchange units consisting of A–III and C–III is off-line and being regenerated, and that the pair of units A–II–C–II has been most recently regenerated, the corn syrup solution will be taken from the influent header 80 through line 81 provided with shut-off valve 82, and introduced into an ion exchange unit A–I through the distributor 11. De-ionized effluent will discharge from unit C–II through line 93 provided with shut-off valve 94, into the effluent header 90. The three-way valve 48 will be so set as to isolate anion exchange unit A–III from the cation exchange unit C–II and simultaneously open the reference pressure connection of the differential pressure controller 27 to the atmosphere. The setting of the spring 60 of the controller 27 will be such that the controlled pressure $P_1$ built up in the air dome of the unit 3 will be adequate to maintain rated or full capacity flow through the unit C–II. It will be seen that the pressure controller 26 will now be subjected to a reference pressure equal to the pressure within the air dome of the unit C–II. Since the resistance to flow rate through the individual ion exchange units is approximately equal, the regulating spring 60 of each of the pressure controller units may be set to the same value. In this manner, the pressure within the air dome of the unit A-II will be greater than the pressure in the air dome of the unit C-II by a value corresponding to the setting S of the regulating spring.

Thus, assuming that a differential pressure of 10 pounds per square inch is required between adjacent ion exchange units in the series in order to overcome flow resistances therebetween including that of the respective ion exchange beds, the pressure within the air dome of the unit C-II may be 10 pounds per square inch gauge; the pressure within the air dome of unit A-II will be 20 pounds per square inch gauge; that in the air dome of unit C-I will be 30 pounds per square inch gauge; and that within the air dome of the unit A-I will be 40 pounds per square inch gauge. Readjustment in the settings of the spring 60 should not be required after the initial installation and adjustment.

During operation, the liquid level in each of the individual units on-line will be maintained at the top of the bed of exchange material therein, and any small change in this liquid level will be compensated for so as to restore it to normal by means of the level controller unit and flow regulating valve associated with each ion exchange unit.

Thus, the differential pressure controller units 24, 25, etc. provide for a uniform pressure differential between air domes of adjacent columns, while the level controllers 72, 73, etc. respond to changes in resistance and flow rate and to cause diaphragm control valves 17, 18, etc. to take such positions as required to cause the total pressure drop between any two columns to equal the pressure differential produced and maintained by the differential pressure control units.

In accordance with a predetermined operating cycle, after passage of a predetermined quantity of corn syrup solution through the exchange units A-I, C-I, A-II, and C-II on-line, the most depleted pair of ion exchangers, i. e. A-I and C-I, will be taken off-line, and the freshly regenerated units A-III and C-III will be put on-line subsequent to units A-II and C-II. This is done by closing off three-way valve 47, closing shut-off valve 82, closing shut-off valve 94, setting three-way valve 48 to interconnect the air domes of exchange units C-II and A-III, setting three-way valve 50 so as to disconnect the air dome of exchange unit C-III from that of exchange unit A-I and expose the reference inlet connection of the differential controller 30 to atmospheric pressure, opening shut-off valve 96, and opening shut-off valve 83 in line 84, and closing shut-off valve 97, and opening shut-off valve 98. With the units A-II, C-II, A-III and C-III now on-line in this sequence, the pressure within the air dome of unit A-II will now be 40 pounds per square inch gauge; that in the air dome of unit C-II will be 30 pounds per square inch gauge; that in the air dome of unit A-III will be 20 pounds per square inch gauge; and that in the air dome of unit C-III will be 10 pounds per square inch gauge. The pressures in the air domes of these units are built up automatically without any resetting of the pressure controllers 26, 27 and 28 or 30. Thus, for example, when the reference pressure connection of the differential controller 27 is subjected to a $P_2$ pressure of 20 pounds per square inch gauge from the air dome of unit A-III, the main valve port of this unit will be open allowing the pressure to be built up in the air dome of unit C-II from the header 23 until the $P_1$ pressure is 30 pounds per square inch gauge.

After the predetermined quantity of fluid undergoing ion exchange treatment has passed through the units A-II, C-II, A-III and C-III on-line, the most depleted units, i. e. A-II and C-II, will be taken off-line and regenerated units A-I and C-I will be put on-line subsequent to units A-III and C-III. The cycle of operation is fully completed when the units A-III and C-III are taken off-line and units A-II and C-II are again put on-line subsequent to regenerated units A-I and C-I.

Figure 4:
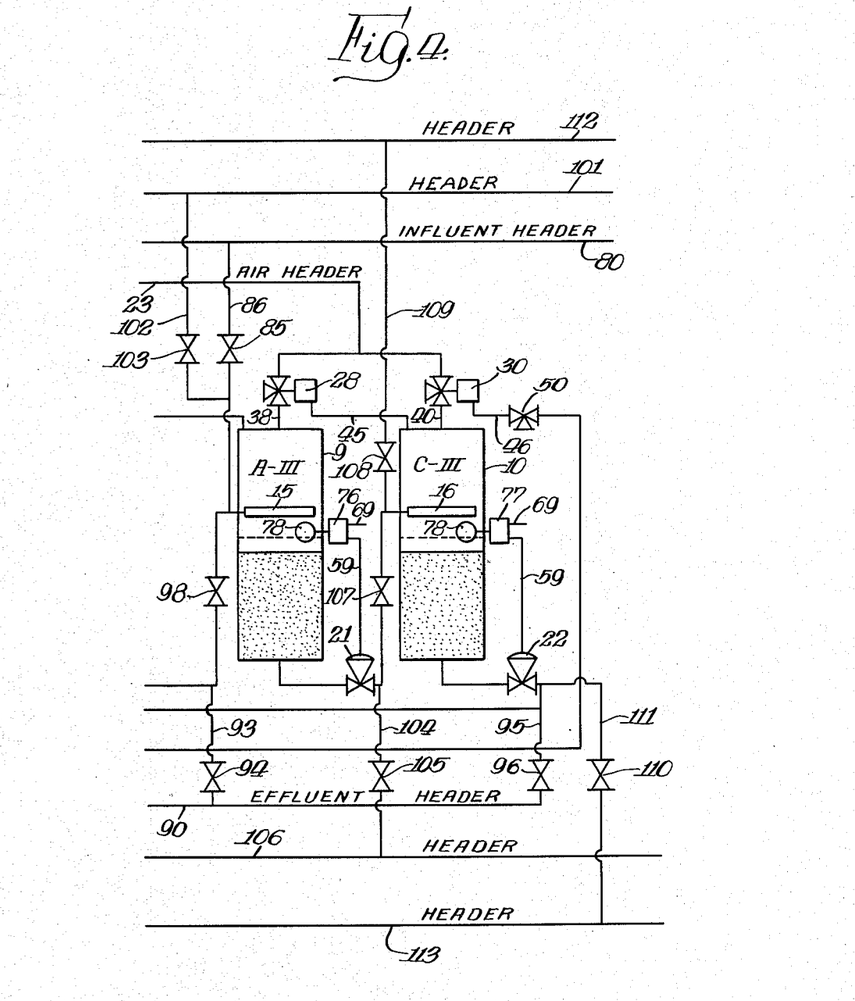
Figure 4 is a diagram of a portion of the ion exchange installation of Figure 1, with two of the individual ion exchange units arranged for either parallel or series flow such as occurs during several steps in the regeneration cycle.

During the time when a given pair of ion exchange units is off-line and undergoing regeneration, it is subjected to a number of different operations some of which involve flow through the two columns in parallel while others involve flow through the two columns in series. These are illustrated in Figure 4. During most of these operations, it is desired that the free board be maintained by use of the air dome just as when the pair is on stream. As an example of parallel flow, valve 85 is closed and liquor is taken from header 101 through conduit 102 and shut-off valve 103 into column A-III through distributor 15. After passage through the bed of ion exchange material in A-III, it is discharged through control valve 21, conduit 104, shut-off valve 105 to header 106, shut-off valve 107 being closed. Simultaneously, liquor is drawn from header 112 through conduit 109, shut-off valve 108 into C-III through distributor 16. After passing through the ion exchange bed of C-III, it is discharged through control valve 22, conduit 111, shut-off valve 110 to header 113, shut-off valve 96 being closed. As an example of a regeneration step in which the flow is through the two columns in series, liquor is taken from header 101 through conduit 102 and shut-off valve 103 into A-III through distributor 15. It leaves A-III through control valve 21 and enters C-III through shut-off valve 107 and distributor 16, shut-off valves 105 and 108 being closed. It leaves C-III through control valve 22, conduit 111, and shut-off valve 110 to header 113.

It was previously pointed out that when this pair is removed for regeneration, three-way valve 50 is operated to connect the reference pressure line of differential pressure controller 30 to atmosphere. A pressure will then be maintained in C-III which is equal to the spring setting S in 30 and which by way of example was assumed to be 10 pounds per square inch gauge. The pressure in A-III will therefore be 20 pounds per square inch gauge. In the case of the series flow operation during regeneration, the control system operates exactly as though this pair were on stream in the secondary position, as previously described. In the case of parallel operation, the control system of C-III operates exactly as though the pair were on-stream in the secondary position. On the other hand, the pressure in A-III will be the same as when it is in series with and is followed by C-III. In other words, the pressure in A-III will be the same as when two columns are in series but the resistance of the circuit will be that of only one column. This decrease in resistance produces a tendency for the level in A-III to decrease which causes the level controller 76 to readjust control valve 21, as previously described, until the pressure drop through control valve 21 is increased by an amount equal to the pressure in C-III. Thus, it is seen that when a pair is off-stream for regeneration, and regardless of whether the flow is in series or parallel, the control system operates as effectively and as simply, without the need for any readjustment, as when the pair is on-stream. Thus, it is seen that as a given pair goes through its cycle from secondary service to primary service to regeneration, the only operation so far as the control system is concerned, which is not inherently automatic, is that of operating the proper three-way valve 47, 48 or 50 so as to connect the reference pressure of the differential controller associated with the second primary column to the first secondary column. For example, when A–I and C–I are on primary service, A–II and C–II, on secondary service, and A–III and C–III are off-stream for regeneration; three-way valve 47 is operated to connect the reference pressure of differential controller 25 to the air dome of A–II. Three-way valves 47 and 50 are in the position which connects the reference pressures of 27 and 30 to atmosphere. When A–II and C–II are placed in primary service, A–III and C–III are in secondary service while A–I and C–I are off-stream for regeneration, it is necessary to operate three-way valve 47 to connect 25 to atmosphere and to operate 48 to connect 27 to the air dome of A–III.

Those skilled in the art will be able to adapt the installation shown to automatic operation by means of known control mechanisms without difficulty.

Figure 3:
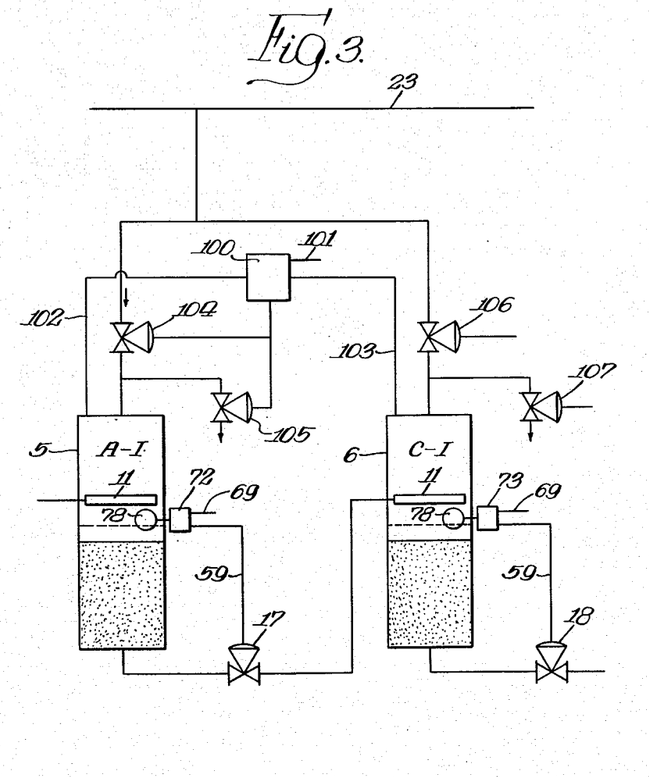
Figure 3 is a diagrammatic view showing two series-connected ion exchange units provided with flow control apparatus in accordance with the present invention wherein the differential pressure controller means corresponds in function to that shown in Figure 2, but is of the larger capacity type operated by means of an outside source of energization.

The capacity of the differential controllers 24, 25, etc. of the type described in connection with Figure 2, which may be characterized as self-operating or self-contained, is somewhat limited. Accordingly, in instances where larger capacities of demands are required of such units, more elaborate differential pressure control units, of the type incorporating a servo mechanism, may be adopted. Reference may now be added to Figure 3 of the drawings for a description of the application of such a differential controller system, to a pair of ion exchange units, as for example, units A–I and C–I of Figure 1.

A pneumatically operated differential pressure controller 100 is associated with each ion exchange unit, e. g. unit A–I. The controller 100 is connected with a source of regulated air pressure by a connection 101 for this purpose. One reference pressure connection of the controller 100 is connected to the air dome of unit A–I through the conduit 102 while a second reference connection communicates through conduit 103 with the air dome of unit C–I. The output pressure connection of the controller unit 100 is connected through suitable conduit means to the diaphragm operated flow control regulators 104 and 105 in such known manner so as oppositely to operate these regulators. The control regulator 104 serves to regulate the admisison of air under pressure into the air dome of unit A–I, taking the air from the header 23. The control regultaor 105 serves to regulate the release of air pressure from the air dome of unit A–I. It will be understood that each of the other ion exchange units, e. g. unit C–I, is provided with similar air pressure control mechanism. Thus, the control regulators 106 and 107 are shown associated with unit C–I as part of its air pressure control mechanism.

In operation, the controller unit 100 is set to produce the desired diffrential in pressure, e. g. 10 pounds, between the air dome of units A–I and C–I. When the system is in equilibrium, the measured differential and the set differential between the air domes will be equal and neither of the air flow regulators 104 or 105 will be operated. Now if the system equilibrium is disturbed so that the measured (i. e. actual) differential pressure between the air domes is less than the set differential pressure, the output pressure from controller unit 100 will change proportionately and cause the flow regulator 104 to open, thereby admitting pressure to the air dome of unit A–I so as to increase the pressure to set value and restore equilibrium. On the other hand, if the system equilibrium is disturbed so that the measured differential pressure is greater than the set differential pressure, then the output pressure from controller unit 100 will change proportionately and operate flow regulator 105 so as to exhaust air from the air dome of unit A–I until equilibrium is restored.

Although the invention has been described in detail in connection with an ion exchange, demineralization, installation of the type wherein pairs of anion and cation exchange units are interconnected in series circuit relationship, it will be appreciated that the invention is equally applicable to ion exchange installations made up either entirely of anion exchange units or cation exchange units interconnected in series circuit relationship.

And while my invention has been described as embodied in apparatus for controlling fluid flows through an ion exchange installation, it is to be understood that it is likewise applicable to effectuate fluid control in other types of installations and operations, such as, for example, in apparatus for decolorizing and filtering liquids, the chlorination of paper stock, treatment of sewage, and similar operations wherein a fluid flows through a series of closed vessels having free board space thereabove which is maintained by an air dome during operation.

Furthermore, it will be understood that certain changes in detail with respect to the arrangement and type of specific pieces of control equipment may be made without departing from the spirit and scope of the invention.

I claim:

1. In an ion exchange installation comprising at least one pair of ion exchange units interconnected in series circuit flow relationship, in combination, a control system for regulating the flow through said installation of fluid undergoing ion exchange treatment, comprising, differential pressure controller means associated with each individual ion exchange unit, conduit means for interconnecting said differential pressure controller means with the air dome of said ion exchange unit associated therewith and with the air dome of the next subsequent ion exchange unit, and conduit means for interconnecting said differential pressure controller means with a source of supply pressure at least sufficient to maintain said fluid flow through said installation, the differential pressure setting of each controller being set to overcome the total pressure drop between adjacent ion exchange units including pressure drop through the respective beds of ion exchange material.

2. In an ion exchange installation comprising at least one pair of ion exchange units interconnected in series circuit flow relationship, in combination, a control system for regulating the flow through said installation of fluid undergoing ion exchange treatment, comprising, differential pressure controller means associated with each individual ion exchange unit, conduit means for interconnecting the controlled pressure outlet connection of each controller means with the air dome of the ion exchange unit associated therewith, conduit means for interconnecting the reference pressure inlet connection of each controller means with the air dome of the next subsequent ion exchange unit, and conduit means for interconnecting the supply pressure connection of each controller means with a source of air pressure at least sufficient to maintain said fluid flow through said installation, the differential pressure setting of each controller being set to overcome the total pressure drop between adjacent ion exchange units, including pressure drop through the respective beds of ion exchange material.

3. In an ion exchange installation comprising a plurality of pairs of anion and cation exchange units, the individual units in each pair being interconnected in series circuit flow relationship, and in operation there being at least two of said pairs of units interconnected in series circuit flow relationship and on-line at one time, in combination, a control system for regulating the flow through said installation of fluid undergoing ion exchange treatment, comprising, differential pressure controller means associated with each individual ion exchange unit, conduit means for interconnecting the controlled pressure outlet connection of each controller means with the air dome of the ion exchange unit associated therewith, conduit means for interconnecting the reference pressure inlet connection of each controller means with the air dome of the next subsequent ion exchange unit connected in series and conduit means for interconnecting the supply pressure connection of each controller means with a source of air pressure at at least sufficient to maintain said fluid flow through said installation the differential setting of each controller being set to overcome the total pressure drop between adjacent ion exchange units, including pressure drop through the respective beds of ion exchange material.

4. In an ion exchange installation comprising a plurality of pairs of anion and cation exchange units each containing an ion exchange bed with air dome thereabove, the indivdiual units in each pair being interconnected in series circuit flow relationship, and in operation there being at least two of said pairs of units interconnected in series circuit flow relationship and on-line at one time, in combination, a control system for regulating the flow through said installation of fluid undergoing ion exchange treatment, comprising, differential pressure controller means associated with each individual ion exchange unit, conduit means interconnecting the controlled pressure outlet connection of each controller means with the air dome of the ion exchange unit associated therewith, conduit means interconnecting the reference pressure inlet connection of each controller means with the air dome of the next subsequent ion exchange unit connected in series, conduit means for interconnecting the supply pressure connection of each controller means with a source of air pressure at least sufficient to maintain said fluid flow through said installation, the differential setting of each controller being set to overcome total pressure drop between adjacent ion exchange units at full flow, including pressure drop through the respective beds of ion exchange material, conduit means interconnecting the bottom of each exchange unit with the next subsequent exchange unit at a point above the top of the bed of exchange material therein, a regulatable flow control valve in each said conduit means interconnecting the bottom of one exchange unit with the next subsequent exchange unit at a point above the top of the exchange bed therein, liquid level control means operatively associated with each of said ion exchange units having a liquid level sensitive element disposed adjacent the top of the bed of exchange material in each unit, and control means operatively interconnecting each of said liquid level control means with the regulatable flow control valve associated with the ion exchange unit common thereto, each of said regulatable flow control valves and the liquid level control means operatively associated therewith serving to maintain the liquid level in the ion exchange unit common thereto approximately at the top level of the bed of exchange material therein.

5. In the combination called for in claim 4, said regulatable flow control valve being diaphragm operated, said liquid level control means being a pilot operated, pneumatic level controller, said liquid level sensitive element being a float operatively interconnected with the pilot of said level controller, and said control means operatively interconnecting each of said level control means with said regulatable flow control valve being in the form of conduit means interconnecting the output pressure connection of said level controller with the pressure chamber of said flow control valve.

6. In an ion exchange installation comprising at least one pair of ion exchange units interconnected in series circuit flow relationship, in combination, a control system for regulating flow through said installation of fluid undergoing ion exchange treatment, comprising, a pneumatically operated differential pressure controller associated with each individual ion exchange unit, conduit means interconnecting one reference pressure connection of said controller with the air dome of said associated ion exchange unit, conduit means interconnecting a second reference pressure connection of said controller with the air dome of the next subsequent ion exchange unit, conduit means for interconnecting the actuating pressure connection of said controller with a source of regulated pressure, conduit means for interconnecting the output pressure connection of said controller in parallel circuit relationship with the pressure chambers of a pair of diaphragm operation air flow regulators whereby increase in output pressure operates one of said regulators while decrease in output pressure operates the other of said regulators, conduit means interconnecting one of said regulators in series between the air dome of said associated ion exchange unit and a source of air pressure at least sufficient to maintain said fluid flow through said installation, and conduit means interconnecting the other of said regulators in pressure relief relationship with the air dome of said associated ion exchange unit, the set differential pressure of each said controller being sufficient to overcome the total pressure drop between adjacent ion exchange units including pressure drop through the respective beds of ion exchange material therein.

7. The method of maintaining a predetermined rate of fluid flow through an ion exchange installation comprising a plurality of individual ion exchange units interconnected in series circuit flow relationship and each of which units has an air dome space above a bed of ion exchange material, with the bottom outlet of each unit being interconnected in fluid flow relationship with the next subsequent exchange unit at a point above the top of the ion exchange bed in the latter, which method comprises utilizing variations in pressure differentials between the said units to actuate control means for automatically maintaining the pressure in the air dome of each ion exchange unit greater than the air dome pressure in the next subsequent unit by a value of X, X being a value sufficient to overcome the total pressure drop between adjacent ion exchange units in said series including pressure drop through the respective ion exchange beds therein, the pressure within the air dome of the last exchange unit in the series being sufficient to discharge fluid therefrom at said predetermined rate of flow.

8. In an installation for controlling fluid flow through at least one pair of closed vessels in series circuit flow relationship, said vessels having free board space thereabove which is maintained by an air dome during operation, in combination, a control system for regulating the flow of fluid through said installation, comprising, differential pressure controller means associated with each of the said vessels, conduit means for interconnecting said differential pressure controller means with the air dome of said vessel associated therewith and with the air dome of the next subsequent vessel, and conduit means for interconnecting said differential pressure controller means with a source of supply pressure at least sufficient to maintain said fluid flow through said installation, the differential pressure setting of each controller being set to overcome the total pressure drop between adjacent vessels.

JAY N. SWARR.

REFERENCES CITED

The following references are of record in the file of this patent:

UNITED STATES PATENTS

| Number | Name | Date |
| --- | --- | --- |
| 2,365,221 | Shafer | Dec. 19, 1944 |
| 2,458,115 | Swenson | Jan. 4, 1949 |
| 2,458,893 | Campbell | Jan. 11, 1949 |